United States Patent [19]

Grube et al.

[11] Patent Number: 5,265,262
[45] Date of Patent: Nov. 23, 1993

[54] SINGLE CHANNEL REMOTE SITE TRUNKING

[75] Inventors: Gary W. Grube, Palatine; John W. Wiens; David J. Kizior, both of Hoffman Estates, all of Ill.

[73] Assignee: Motorola, Inc., Schaumburg, Ill.

[21] Appl. No.: 739,581

[22] Filed: Aug. 2, 1991

[51] Int. Cl.$^5$ ............................................. H04B 7/00
[52] U.S. Cl. .................................... 455/17; 455/34.1; 455/56.1; 455/89
[58] Field of Search ................................. 455/14–17, 455/33.1, 33.2, 34.1, 34.2, 54.1, 56.1, 58.2, 73, 74, 89; 379/61

[56] References Cited

U.S. PATENT DOCUMENTS

| | | | |
|---|---|---|---|
| 4,553,262 | 11/1985 | Coe | 455/15 |
| 4,718,108 | 1/1988 | Davidson et al. | 455/17 |
| 4,723,264 | 2/1988 | Sasuta et al. | 379/58 |
| 4,974,251 | 11/1990 | Ohta et al. | 379/61 |
| 4,989,230 | 1/1991 | Gillig et al. | 379/61 |
| 5,058,199 | 10/1991 | Grube | 455/15 |
| 5,095,529 | 3/1992 | Comroe et al. | 455/16 |

OTHER PUBLICATIONS

"Systems Saber" Motorola Products; 1990; pp. 1–8.

Primary Examiner—Reinhard J. Eisenzopf
Assistant Examiner—Andrew Faile
Attorney, Agent, or Firm—Pedro P. Hernandez

[57] ABSTRACT

A system and method for providing single channel remote site trunking is described. The present invention allows for radios (116) operating in single channel non-dedicated control channel sites (104) to communicate with radios (112, 114) in dedicated control channel sites (102) which are part of the system (100). Further, the present invention will allow for non-trunked radios to utilize the benefits of trunking when operating in the single channel remote site. By mapping the ID's of the radios in the system (100) the system can keep track of all radios in the system whether in a remote single site (104) or in one of the dedicated control channel sites (102) and thereby link allow radios in one site to automatically communicate with the radios in the other site.

12 Claims, 7 Drawing Sheets

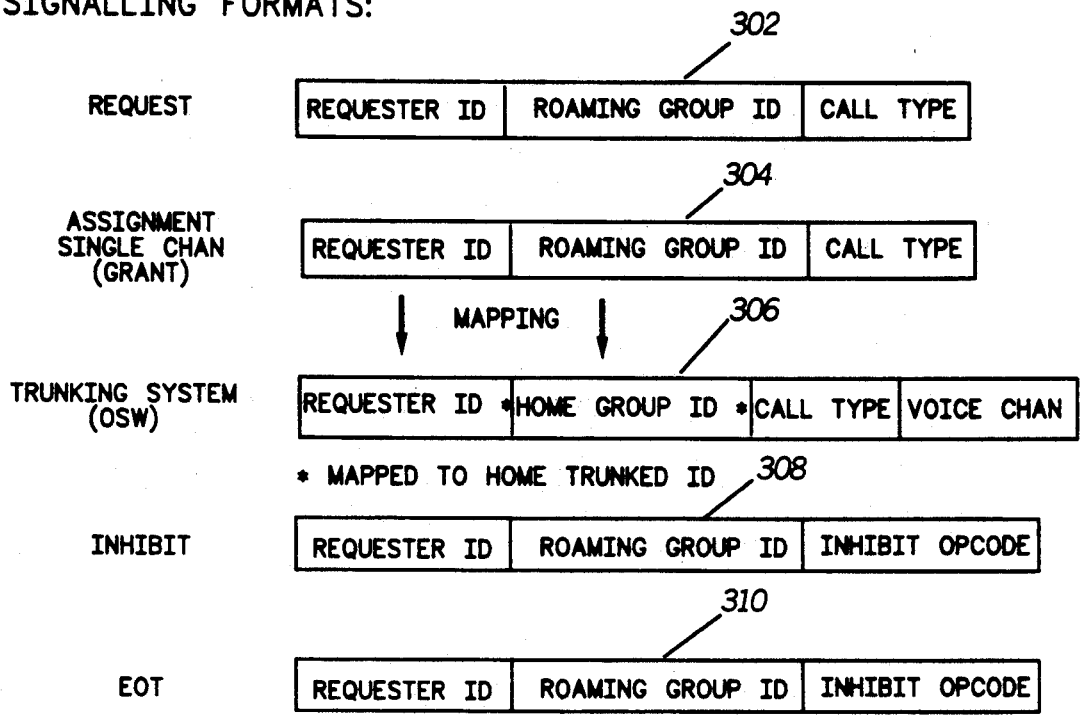
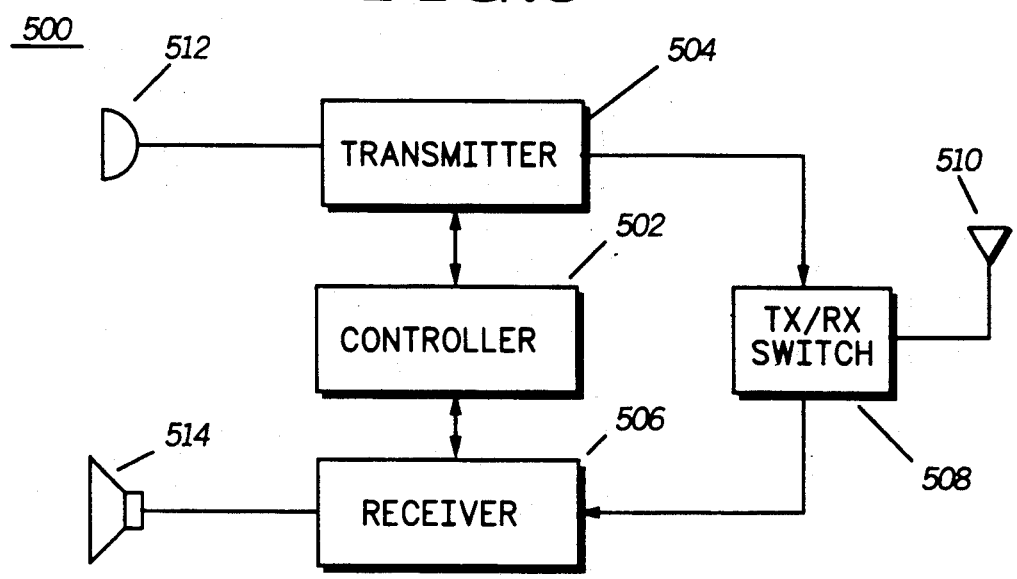

SINGLE CHANNEL REMOTE SITE TRUNKING

TECHNICAL FIELD

This invention relates generally to communication systems, and more specifically to trunked communication systems.

BACKGROUND

Trunked radio frequency (RF) systems are normally constructed with enough infrastructure (e.g. antenna sites, repeaters, etc.) to match the usage rate per square mile of coverage (typically measured in Erlangs load per square mile). In a typical trunked radio system, the radio frequency channels are shared by a multitude of radio unit users over the geographic area serviced by the particular transmitter site in question.

In order to provide radio service over a large geographic service area, as is typically required in public safety and private utility radio systems, additional fixed radio transmitter sites are constructed and linked together with a trunked network such as a Coverage Plus TM or SMARTNET TM system manufactured by Motorola, Inc. Once again, the number of channels (repeaters) required at each site depends on the actual traffic load in terms of Erlangs. Many times when designing a trunked radio system, certain sites are found to have low levels of usage by radio users, these are typically sites located away from the central system areas (typically away from congested urban areas). Unfortunately, even though these sites have very limited traffic (usually under 100 radios), the area still requires at least one voice channel. Since it is desired to make these low traffic density sites part of the overall trunking system and since for each remote site a dedicated control channel is also required do to the system design requirements found in dedicated control channel trunking systems (systems such as the Coverage Plus TM, SMARTNET TM and other dedicated control channel trunked systems), it becomes very expensive to support these remote sites, since at the minimum two repeaters are required at a site. A need exists for increasing the capabilities of single repeater sites which are part of a larger trunked system having dedicated control channel sites.

SUMMARY OF THE INVENTION

Briefly described, the present invention contemplates a system and method of automatically allowing radios located in a first communication site having a dedicated control channel to communicate with radios located in a second non-dedicated control channel site.

According to the invention a radio communication system comprises a system control means and a first communication site having a dedicated control channel and at least one communication channel, the first communication site being coupled to the system control means and the radios operating within the first communication site being responsive to the system control means via the dedicated control channel. A second non-dedicated control channel communication site having a communication channel is also coupled to the system control means. The system control means further includes a mapping means for allowing the radios in the first communication site to automatically communicate with the radios in the second non-dedicated control channel communication site.

In another aspect of the present invention a communication device capable of operating in dedicated and non-dedicated control channel sites is described.

In still another aspect of the present invention, a method for automatically linking radios located in a dedicated control channel site with radios located in a second non-dedicated control channel site is described.

BRIEF DESCRIPTION OF THE DRAWINGS

In FIG. 3 a typical set of signaling formats in accordance with the invention is shown.

In FIG. 5 a block diagram of a communication unit in accordance with the present invention is shown.

DETAILED DESCRIPTION OF THE PREFERRED EMBODIMENT

Figure 1:
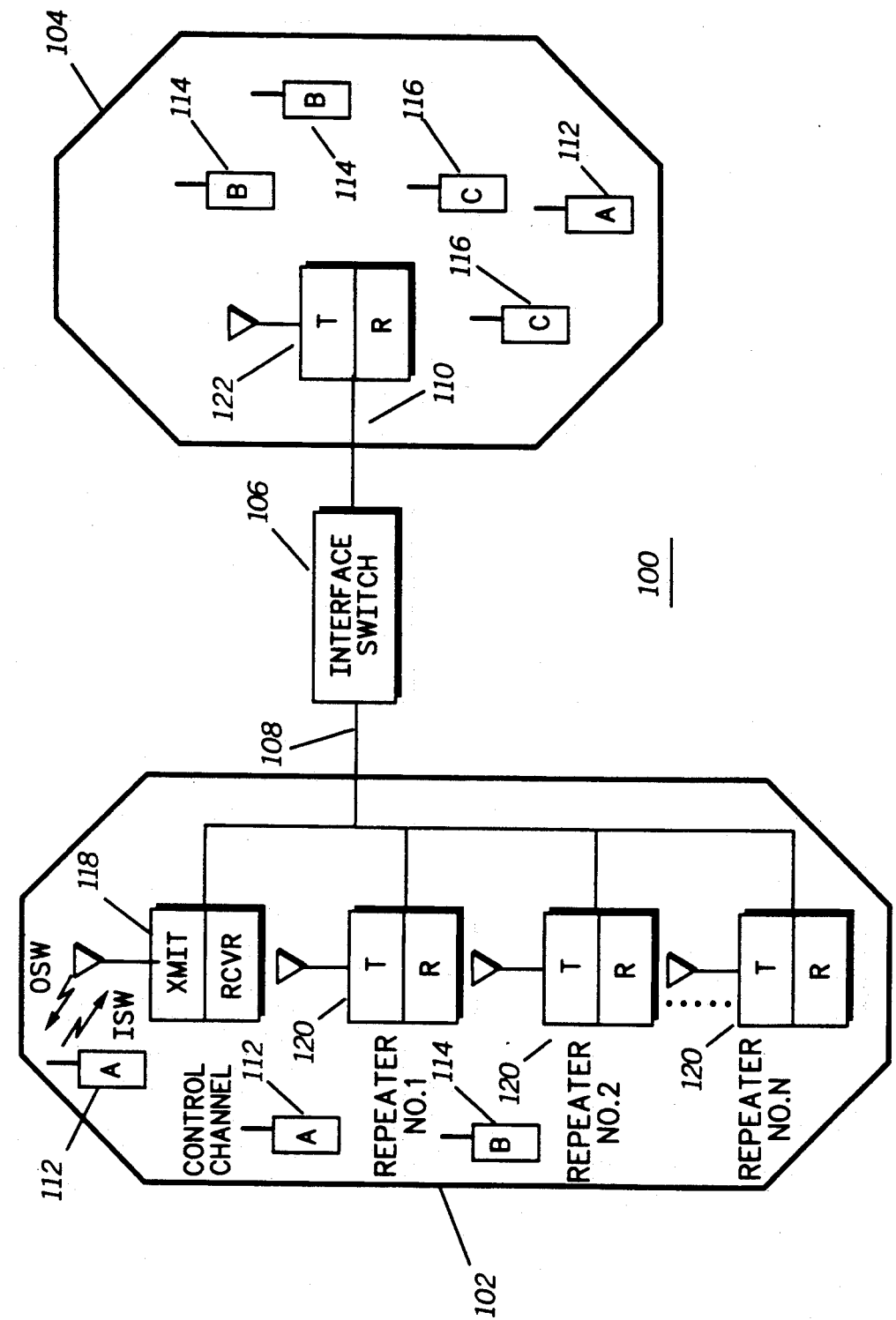
In FIG. 1 a block diagram of a trunked communication system in accordance with the present invention is shown.

Referring now to the drawings and in particular to FIG. 1, there is shown a block diagram of a trunked communication system 100 in accordance with the present invention. Trunked radio system 100 comprises a first or high density operating region (or site) 102 and a second or low density operating region (or site) 104. In the first operating region there is found a set of repeaters 120 (or channels as they are referred to in the art) and a control channel 118. All of the repeaters 118 and 120 are connected via bus 108 to a system control means such as central interface switch 106. Bus 108 allows audio and control information to be exchanged between the interface switch 106 and the individual repeaters 118 and 120 of site 102. In typical trunking systems, bus 108 can be extended over many miles by using microwave or phone line links as known in the art. Bus 110 allows audio and control information to be transferred between repeater 122 found in second operating region 104 and interface switch 106. Also shown in FIG. 1 are a set of trunked radios, group "A" radios 112, group "B" radios 114, and group "C" radios 116. Sites 102 and 104 can have some overlapping coverage areas where portions of one communication site overlap with the other site(s). Also, the communication sites have almost no geographic limit as to their size, except for the practical limits of cost of implementation. Those skilled in the communication art, understand that many modifications to the sites shown in FIG. 1 can be made, as for example, the addition of satellite receiver sites to the individual repeaters, etc.

The number of voice/data repeaters 120 utilized in first operating region 102 will depend on the traffic load in the first operating region 102. The more radios operating in region 102, the more voice/data repeaters 120 will be required to service the area in order to provide the adequate amount of channel resources and to limit undue delays and minimize system access times.

Interface switch 106 acts as the system central controller for system 100. Interface switch 106 is comprised of a central computer which controls the overall operation of all communication devices (radios 112, 114, and 116) and repeaters associated with system 100. A more complete technical description of a trunked central controller and trunked system which may be used advantageously with the teachings of the present invention may be found in Motorola Instruction Manual 68P81066E60 entitled "Trunked System Central Controller." A basic overview of the operation of a trunked system which utilizes dedicated control channels may be found in publication R4-1-84C entitled "Basic 800 MHz Trunked Radio systems". These manuals are available from the technical writing services department of Motorola, Inc., 1301 E. Algonquin Rd., Schaumburg Ill., 60196, and are herein incorporated by reference as if fully set forth herein. The interface switch 106 comprises a central computer having appropriate software and hardware for controlling the overall operation of system 100. Interface switch 106 includes appropriate software to control and keep track of all radios operating in system 100 and for assigning radio groups to individual repeaters such as repeaters 120 (e.g. Repeater No. 1) in order to allow the radios to communicate with each other. Interface switch 106 is also responsible for coordinating the activities of all the sites (in this case first and second operating regions 102 and 104) which are connected to the switch 106, thereby allowing radios operating in the first region 102 to communicate with radios in the second region 104.

In trunked system 100, signaling words (normally referred to as outbound signaling words, hereafter referred to as OSWs) are generated by interface switch 106 (the system central controller) and are then transmitted over the control channel 118 continuously to all of the portable radios 112 in the first operating region 102 (assuming a call is directed to radios in the first operating region 102). The OSWs inform specific radios such as radios 112 or groups of radios when to move to one of the voice/data channels (repeaters 120) that are available on system 100. The OSW's also inform the radios of other important system information such as emergency situations, regrouping situations, etc. The OSWs are comprised of a string of data bits (data packet) which carry system and control information to the individual radios. For example, a channel grant OSW will automatically inform a radio 112 to change it's operating frequencies to those of the repeater it has been assigned to automatically, without any intervention by the radio user. The radios, such as radios 112 in radio group "A", that operate in a trunked system 100, spend a great deal of the time receiving and decoding the information being transmitted over the control channel 118 in order to determine if any information is directed to the particular radios 112 (or radio group). When system 100 is in an idle state, all radios in the system have their receivers monitoring the control channel for information (typically a control channel is found in each of the independent operating regions in order to control the radios operating in those regions). In a system having several sites, such as site 102, which have a dedicated control channel, all radios in that particular site will be monitoring that particular site control channel for control information.

In order to better understand the operation of a typical trunked radio system, an example of the sequence of events which occur for a standard radio group call originating in first operating region 102 will now be described. When radio 112 (in radio group A) activates it's push-to-talk button (PTT), a burst of data is transmitted by radio 112 to the interface switch 106 via the first operating region's control channel 118. The data that is sent is normally referred to as an inbound signaling word, or ISW, which in this case constitutes a request for a voice channel (repeater). Preferably, any of the repeaters 120 except the one acting as the control channel 118 can be used as a voice/data channel for site 102. The ISW is then sent from the control channel 118 to the interface switch 106 for processing via bus 108. The interface switch 106 upon receiving the ISW, reviews the status of all the repeaters 120 and assigns an unused repeater 120 (e.g. Repeater No. 2) to the requesting radio and radios in his group in the case of a group call. This is done by sending an information signal, or as it is more commonly referred to, an OSW via the control channel 118 directing all radios 112 in group "A" to a frequency corresponding to that of the assigned repeater 120 (in this case, repeater No. 2, or also known as channel No. 2). The outbound signaling word is received by all radios 112, but only the radios in group "A" will be transferred to repeater No. 2 (120). Since the OSW contains information regarding which radios the information is for, the other radios 114 in site 102 will continue to monitor the control channel 118 for OSWs, until they receive an OSW which is directed to them. The individual radio 112 which activated the PTT is now able to talk to any radio 112 in his group over repeater No. 2 (120). If other group "A" radios 112 are found in other sites of system 100 having dedicated control channels they too will be linked to the conversation. Unfortunately, for those group "A" radios 112 in single repeater site locations (similar to site 104) the prior art implementations would not allow these "roaming radios" to be automatically included in their home talk group (talkgroup "A"). Prior art implementations also do not allow not allow for group partitioning at the single channel sites (all radios in the site would be able to listen to the conversation).

The present invention takes the operation of a typical trunked system and expands its capabilities by including a control mechanism which "maps" control signaling information between the two flavors of sites, namely those with a dedicated control channel (site 102) and those without a dedicated control channel (site 104). Without the present invention, the second operating region 104 would be required to have a dedicated control channel repeater similar to control channel 118, found in the first operating region 102 in order to automatically include roaming radios in their "home" talk groups (dedicated control channel sites). Also, the present invention provides for group partitioning of radios found in single repeater sites. The present invention also allows for "conventional only radios" (non-trunked capable) to communicate with trunked radios operating in the system via a single channel site. Radio units operating in the first operating region 102 will operate as they normally operate in a conventional trunked system, namely in the normal trunked fashion as described previously above. After they have successfully acquired the correct control channel, they can remain in touch with system activity pertinent to them by receiving the control channel information. If a radio unit should get out of range of the trunking system in the first region 102, the radio unit will lose contact with the control channel 118.

A radio unit utilizing the present invention will revert to checking a pre-programmed list of secondary frequencies which are stored in the radio where it may find one of these single channel remote sites (such as second operating region 104) which are part of system 100. The radio will beginning scanning this pre-programmed list of secondary channels after losing synchronization with the control channel information for a predetermined period of time.

Figure 2:
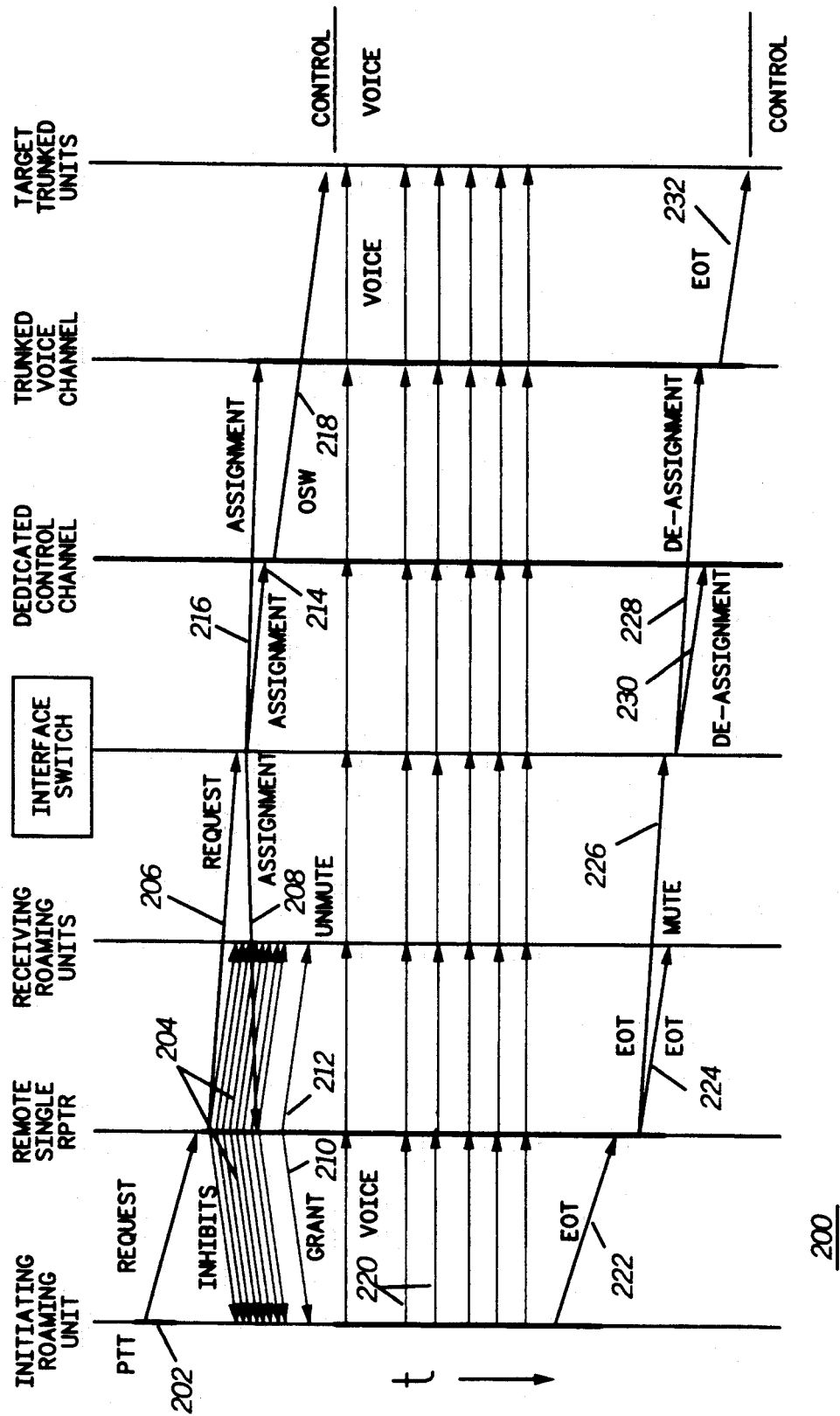
In FIG. 2 a mapping diagram showing how a roaming unit initiates a cross-system call in accordance with the present invention is shown.

In FIG. 2 a mapping diagram showing how a roaming radio, for this example we will use radio 114 (in radio group "B") that is located in a single channel repeater site 104, can automatically establish communications to its "home system" trunked talkgroup (those in first operating region 102) simultaneously along with the local roaming units (those in the second operating region 104) that it is associated with. The process starts with the roaming radio 114 transmitting a request to talk signal 202. This is unique to the present invention in that normally there is no request transaction in a single channel repeater since a clear inactive channel is normally indication enough that the channel can be used directly. The request signal ISW will contain at least the individual unit's identity, the target groups identity, and the particular call type of the group call (a discussion of the signalling formats follows). These individual and group identities are those associated with the requesting and local target units for site 104. The ID scheme allocations will normally have to be different between the first operating site 102 and the single channel site 104. The local roaming ID's may either be preassigned (stored in the radio) or dynamically assigned as the radio unit roams on to the single channel site 104 by the system controller (interface switch 106).

When a request signal is decoded by the single channel repeater logic located in the interface switch 106, it will start to transmit an inhibit signal 204 on the outbound duplex frequency of repeater 122. This serves two purposes, first, it sends an acknowledgment to the requesting unit to discontinue its retry sequence (which is typically part of a request) and secondly, it informs other roaming units (those in site 104) that the channel is not available (channel busy) while the new call setup is being processed. At the same time, the single channel repeater 122 sends a copy of the decoded request 206 via bus 110 to the interface switch 106 for further processing. There, the mapping process is done where a "look-up" is executed to translate the individual and group ID's into the equivalent "home" trunking system identities (site 102). This is accomplished using conventional software programs stored in the interface switch 106. This mapping (linking) of radio identification information will allow a radio in a single repeater site 104 to "join" the radio's normal trunked talkgroup (group of radios the radio is associated with when operating in site 102). Next, the service request is processed in a relatively normal fashion by the interface switch 106, i.e. 1) an authorization check to make sure radio 114 is allowed to be on the system is performed, 2) the available resources (repeaters) are matched against those required by the call type, and 3) resource (repeater) and user assignments are made (e.g. inform the other radio units which are part of the radio group).

When the assignment is made it will take two forms for the two directions shown. One form 208 is identical to the original request where the ID's (radio Id's) are from the roaming (radios in site 104) subset. This is of course sent back to the single channel site 104 and encoded over-the-air to the requesting unit 114 and the associated roamers (radios in the same talkgroup and in a single channel repeater site such as site 102). The requesting unit may then proceed to use the same channel to transmit voice after receiving the channel grant 210 from repeater 122, a channel grant 212 is also sent to all of the roaming radios that are in the same radio group as the initiating roaming unit in order for the associated roaming radios to unmute and listen to the conversation.

The second form of the assignment message, going to the trunking control channel 214 and voice channel 216, uses the mapped identities in the "home trunked system" that also contains the trunked voice channel number. This assignment information will be formed into a standard Outbound Signaling word (OSW) 218 to command the units on the trunking system (in this case radios in site 102), associated with this roamer, to go to the assigned voice channel (repeater) to hear the voice traffic. For example, the radios can be assigned to Repeater No. 1 in site 102 in order to be "linked with the radios utilizing the repeater 122 in site 104.

When the assignment is made, the interface switch 106 will connect the audio path from the single channel repeater 122 to the correct trunked voice channel 120 (in this case repeater No. 1). When the requesting unit transmits speech 220, it will be received by the single channel repeater 122, transmitted back by the single channel repeater transmitter to the associated roaming radios and sent up the link via bus 110 to the Interface switch 106 for distribution into the trunking system sites such as site 102 (and other sites with a control channel 118 that are not shown and that have radios in the same talkgroup).

When the requesting unit releases his push-to-talk (PTT), an end of transmission (EOT) signal 222 is sent to the single channel repeater 122. The signal is then repeated by the single channel repeater 122 (shown as signal 224) in order to mute the receiving roaming radios, and it is also sent over the control link via bus 110 to the interface switch 106 (shown as 226). There, the interface switch 106 will end the call by removing the control channel repeats for this trunked call from the control channel (deassignment signal 230) and it will send a trunking voice channel format EOT over the assigned voice channel on the trunking sites, sites such as site 102 (signal 232). The receiving trunking radios will then leave the voice channel to return to the trunked control channel for further assignments once they receive the EOT message 230.

While analog FM voice will work with the present invention, it will be more desirable to use digital voice modulation. Preferably, the present invention utilizes the capabilities of digital modulation in order to imbed control signals in the actual message transmissions. The imbedded control signals can be used in the single channel site 104 to indicate the assigned group identity during the transmission from the repeater's transmitter. The imbedded signals will also keep radios not associated with the group muted. In addition, the imbedded data can send limited text to any radio at the site while the repeater is being used for voice by another group of radios. In a typical FM trunked system low speed data is sent over the voice channels (repeaters) for automatic muting of receiving audio circuitry. Continuous tone subaudible signals accompany all radio originated transmissions. While base-to-mobile transmission contain a digital subaudible control signal.

In the case the request has been met with a condition of trunked resource unavailability (repeater 122 utilized by another radio group), the single channel site 104 would be instructed by the interface switch 106 to continuously transmit a busy code word instead of a radio inhibit signal. When the resource frees up, the channel grant sequence will continue as shown. During the busy signal time-frame, other single channel site units from other groups could burst in their unique request as well in order to queue up for usage of repeater 122.

In FIG. 3, signalling formats for some of the different packets utilized by the present invention are shown. Request packet 302 is shown comprising a requester ID (unit requesting channel grant) followed by a set of bits establishing the requesting radio's roaming group ID (as discussed before this can be pre-stored in the radio or dynamically assigned by interface switch 106 upon the radio entering site 104), followed by a set of bits specifying the type of call the radio is requesting. The dynamic assignment of the radio roaming group ID can be accomplished by requiring the radio to register with interface switch 106 upon entering site 104. Once the radio becomes register, interface switch 106 can transmit a data packet to the radio containing the radio's roaming group ID, etc. The request packet is sent by the radio unit requesting access to the trunked system via the single channel repeater site 104. Shown below the request packet 302 is the single channel assignment (grant) 304. The single channel assignment packet is comprised of a set of bits identifying the unit which made the request, the roaming group ID of the unit, and the call type. Once the signal channel switch 106 maps the requester ID and roaming group ID into a corresponding requester ID and home group ID which are part of the trunking system OSW. The trunking system OSW also includes information describing the type of call and the voice channel information. The mapping of the radios in the two sites (102 and 104) is accomplished by the interface switch 106 utilizing software which links radios in the roamers that move to the single repeater site 104 to their talkgroups which they use when they are located in site 102.

The inhibit packet 308 is shown comprising the requester ID, roaming group ID, and an inhibit opcode information. The inhibit packet is used to inhibit other radios trying to access the single channel repeater 122 as well as the radio that made the request from transmitting until a channel grant is authorized. The End of transmission messages which are shown in FIG. 2 includes the requester ID, roaming group ID, and an inhibit opcode.

Figure 4:
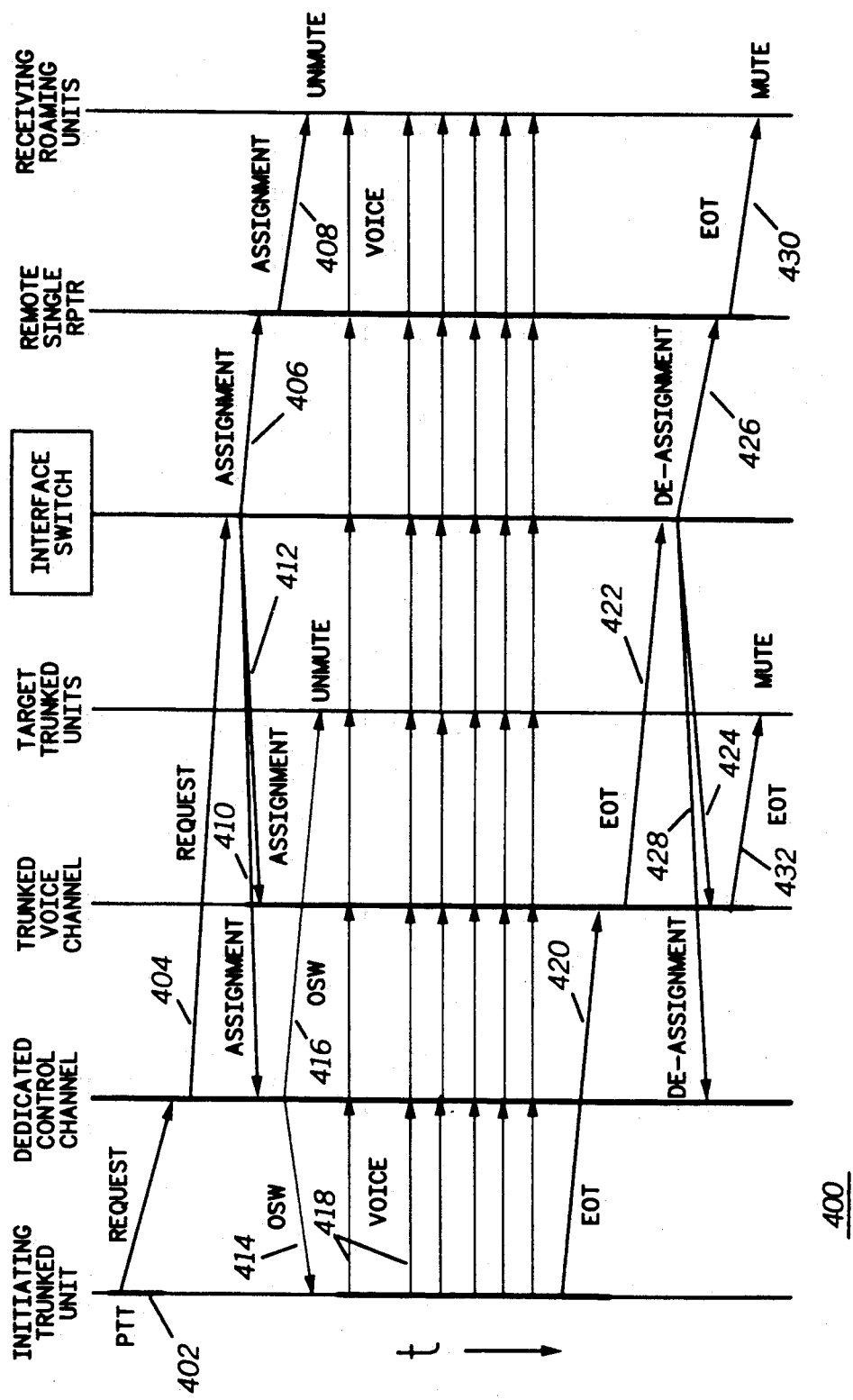
In FIG. 4 a mapping diagram of a "home" trunked unit initiating a cross-system call is shown in accordance with the present invention.

The mapping sequence, when a call is originated by a radio operating in a trunked site having a dedicated control channel such as site 102 and the call is to include radios located in a remote single channel repeater site 104, is shown in FIG. 4. This case occurs when a radio or radios which are part of a radio talkgroup group are located in dedicated control channel sites (such as site 102) and in limited single repeater sites in the low traffic density areas. For example, a group "B" radio 114, in site 102, wants to communicate with group "B" radios 114 in site 104. Radio 114 in site 102 sends a request 402 to control channel 108 for a channel. The request is sent via bus 108 to interface switch 106 for processing. When the assignment is made, interface switch sends a standard assignment signal 410 to control channel 118 and to a voice channel (repeater No. 1 in site 102) via assignment signal 412. The second form of the assignment, going to the remote single repeater via signal 406 and to the roaming radios via assignment signal 408 informs the signal repeater site and radios of the assignment. These assignments use the mapped identities which are formed into a standard OSW as previously shown in FIG. 3. When the assignment is made, the interface switch 106 will connect the audio path from the trunked channel 120 to the single repeater 122. A grant OSW 414 and 416 will be sent to the initiating trunked radio and to those other trunked units in the dedicated control channel sites. These OSW's are repeated, from time to time during the call, in order to collect radios which join the site at a later time.

At this point, the initiating radio will begin sending voice messages 418. Once the initiating unit releases his PTT, an end of transmission (EOT) signal 420 will be sent to the trunked voice channel. This EOT is in turn sent to the interface switch 106 via bus 108. At which point the interface switch 106 will send a de-assignment signal 426 to the remote single repeater 122, which in turn sends an EOT 430 to the receiving roaming radios in site 104. The interface switch 106 at the same time sends a de-assignment signal 428 to the dedicated control channel 118 to suspend repeats of OSW 114, and a deassignment signal 424 is sent from interface switch 106 to the trunked channel 120. Trunked channel 120 in turn sends an EOT signal 432 to the other units in site 102 that where receiving the transmissions (radios in the same talk group).

In FIG. 5 a simplified block diagram of a communication device such as a radio 500 in accordance with the present invention is shown. Radio 500 includes a transmitter means such as transmitter 504 and a receiver means such as receiver 506 which are selectively coupled to antenna 510 via antenna switch 508. In the case of a full duplex radio (e.g. cellular radio) the antenna switch 508 can be replaced by a conventional duplexer as known by those skilled in the art. A standard microphone 512 is coupled to transmitter 504 for allowing voice messages to be inputted into transmitter 504. A speaker 514, is in turn coupled to receiver 506 for the presentation of voice messages. The overall operation of radio 500 is controlled by a control means such as controller 502. Controller 502 can be a conventional microprocessor or microcontroller with associated I/O's, memory locations, etc. All of the automatic channel selection done by radio 500 is performed by trunking software which is stored in the controller memory and performed by the controller 500. In the case that the mapped identities are to be pre-stored in the radio, as previously discussed, they can be stored in controller 502. If the roaming group ID and requester ID's are sent via interface switch 106, they can be received by receiver 506 and stored in controller 502 for later use. Controller 502 has a means for automatically determining when radio 500 leaves a dedicated control channel site 102, by determining that receiver 506 is no longer receiving control channel information after a certain period of time has elapsed from not receiving information from control channel 118. This can be accomplished by software which is stored in controller 502 that decodes information being received by receiver 506. Once control channel synchronization is lost, controller 502 can begin scanning a pre-determined list of single channel sites 104 stored in the radio. Once radio 500 "locks on" to one of these sites, controller 502 can begin decoding the received OSW's for information as what to do next (e.g. unite with a group call originating at a dedicated control channel site 102, etc.).

Figure 6:
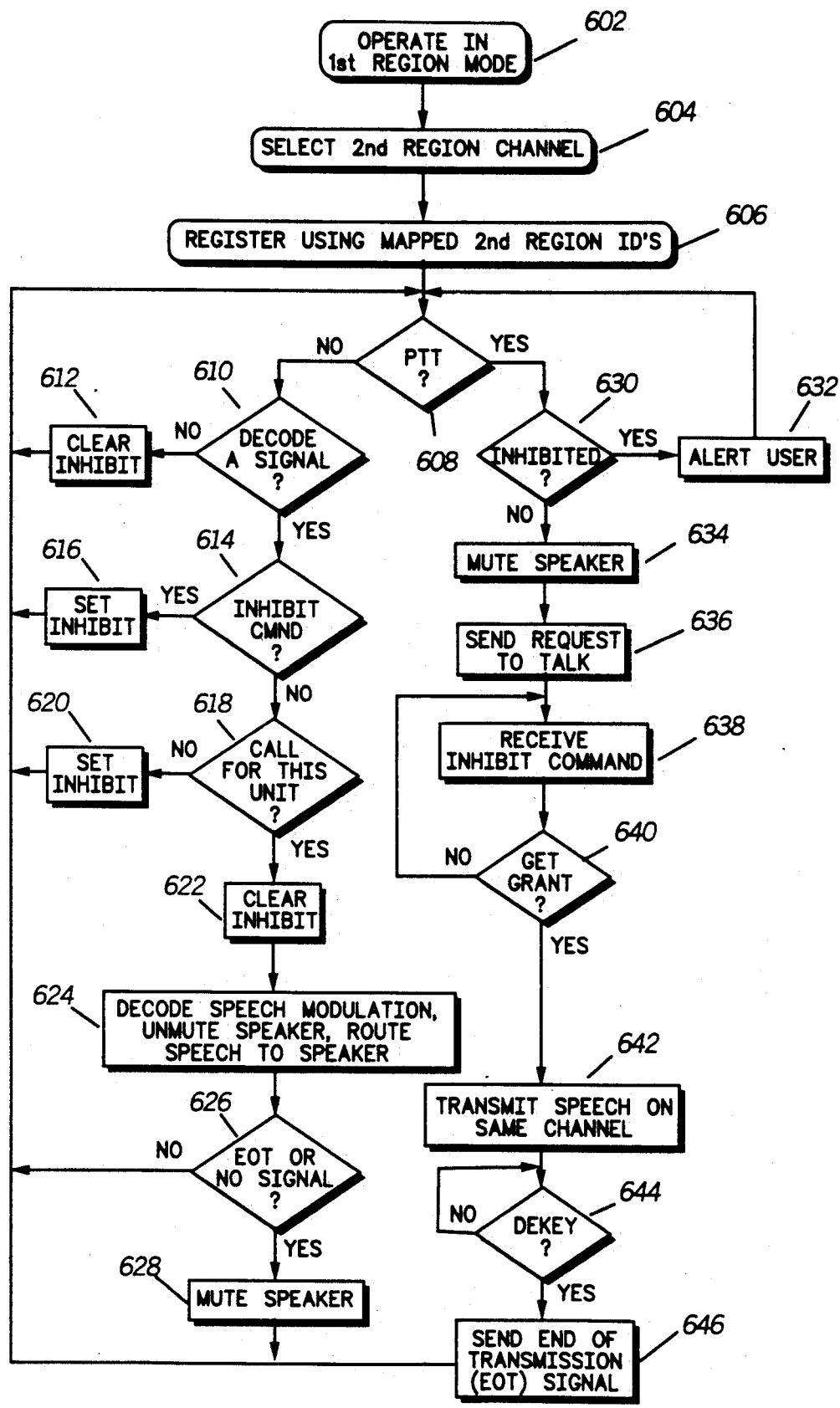
In FIG. 6 a flow diagram of a typical communication unit operation sequence in accordance with the present invention is shown.

In FIG. 6, a flow diagram of a typical communication unit operation sequence in accordance with the present invention is shown. In step 602 the communication device is shown operating in a first region, such as first site 102. Step 604 shows that radio 500 has moved from site 102 into a second site 104. At this point, radio 500 has determined that it is in a single repeater site 102 and radio 500 registers into repeater 122 using the mapped region ID's for site 104. In decision step 608 it is determined if the PTT of radio 500 has been depressed. If the PTT has been depressed, radio 500 determines if it is receiving an inhibit signal in decision step 630 from repeater 122. If yes (repeater is already busy with another call), the user is alerted in step 632, typically with a system busy tone outputted by controller 502 to speaker 514. If no inhibit signal is received in step 630, the radio has its speaker muted in step 634 and a request to talk signal is sent in step 636. Radio 500 then receives an inhibit signal in step 638 which makes radio 500 discontinue it's channel request retry sequence. In decision step 640 it is then determined if a channel grant from repeater 122 has been received. If no grant has yet been received, the radio continues to monitor for the grant. If a channel grant is received, the radio is allowed to begin transmitting speech/data. In decision step 644 it is determined if the radio has dekeyed. If the radio has been dekeyed, an EOT signal is sent in step 646, and the radio 500 returns to step 608.

If, in step 608 the PTT has not been activated, the routine goes to decision step 610 to determine if it is receiving any signals to decode. If no signals are received, the radio clears any transmission inhibit flags and returns to step 608. If a signal is being received that requires further decoding, the routine moves to decision step 614 to determine if it is an inhibit command. If it is an inhibit command, the radio sets an internal inhibit flag and returns to step 608. In decision step 614, if it is determined that the signal is not an inhibit command, it is then determined in decision step 618 if the signal is addressed for the particular radio (e.g. call for his talk group). If, in decision step 618, it is determined by radio controller 502 that the call is for the radio, in step 622 the inhibit flag is cleared. In step 624, the radio's speaker is unmuted and radio 500 begins receiving the transmission. In decision step 626, radio 500 determines if an EOT signal has been sent or signals are no longer present at receiver 506. If neither condition is satisfied, radio 500 returns to step 608. If an EOT is received, the radio's speaker 514 is muted and the returns to step 608.

Figure 7:
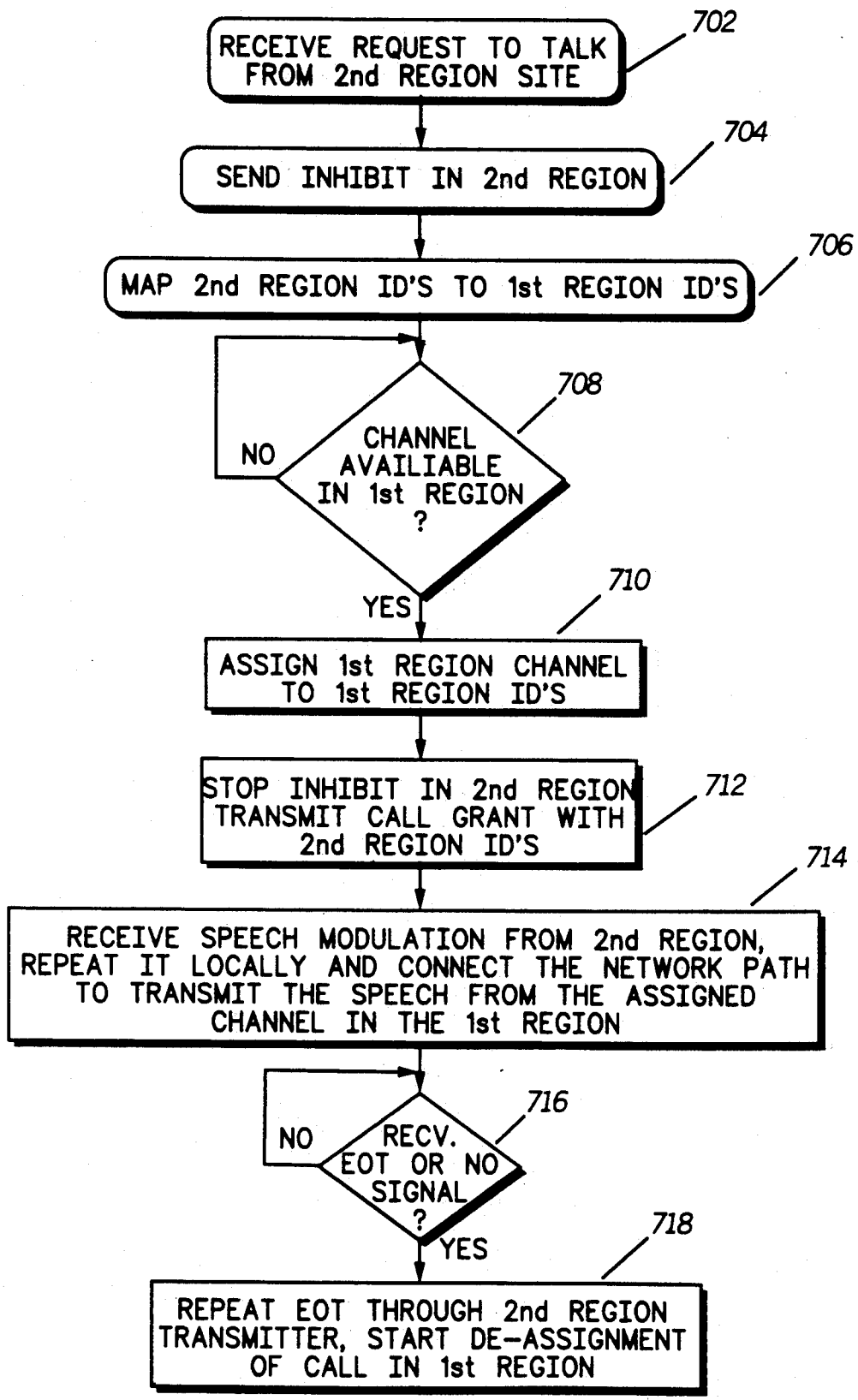
In FIG. 7 a flow diagram of a typical sequence of operation for the system infrastructure in accordance with the present invention is shown.

In FIG. 7, a flow diagram of a typical sequence of operation for the system infrastructure (e.g. repeater, interface switch, etc.) in accordance with the present invention is shown. In step 702, interface switch 106 determines if a request to talk from region 104 has been received via bus 110. If a request has come in, an inhibit signal is transmitted by repeater 122 in order to prevent the requesting radio and any other radios from transmitting in step 704. In step 706, interface switch 106 maps the identification information from the radio in the second region (site 104) to radio identification information of radios in the first region (site 102). This allows for the mapping (linking) of radios in site 104 to radios in site 102 in order to group radios in the same talk group together. By mapping the radio identification information, interface switch 106 can keep track of which radios are in which single repeater sites, such as site 104. Next, in decision step 708, interface switch 106 determines if any channel 120 is available for use in first region 102. If no channel is available, the interface switch keeps looking for an in-process transmission to end in order to assign the repeater to the new call. If interface switch 106 determines that a channel is available, it assigns in step 710 that channel 120 (e.g. repeater No. 1) to the units located in site 102. Next, in step 712, interface switch 106 stops transmitting inhibits to the radios in site 104 and transmits a channel grant to the radio initiating the call and those radios associated with that call (e.g. radios in the same group for a group call, radios assigned to a dynamic regrouping group, etc.). Then in step 714 the requesting radio is allowed to transmit and repeater 122 retransmits the information to the associated radios in site 104, while the audio is also patched via bus 110 through interface switch 106 and then via bus 108 for retransmission by repeater No. 1 (120). The interface switch 106 then determines in decision step 716 if an EOT message 226 has been sent by the remote single repeater 122. If an EOT is received, interface switch 106 then sends in step 718 de-assignment signals 230 and 238 to radios in site 102 and an EOT signal 232 to all of the target radios. At the same time, the single channel repeater 122 repeats the EOT to all of the radios in site 104.

Figure 8:
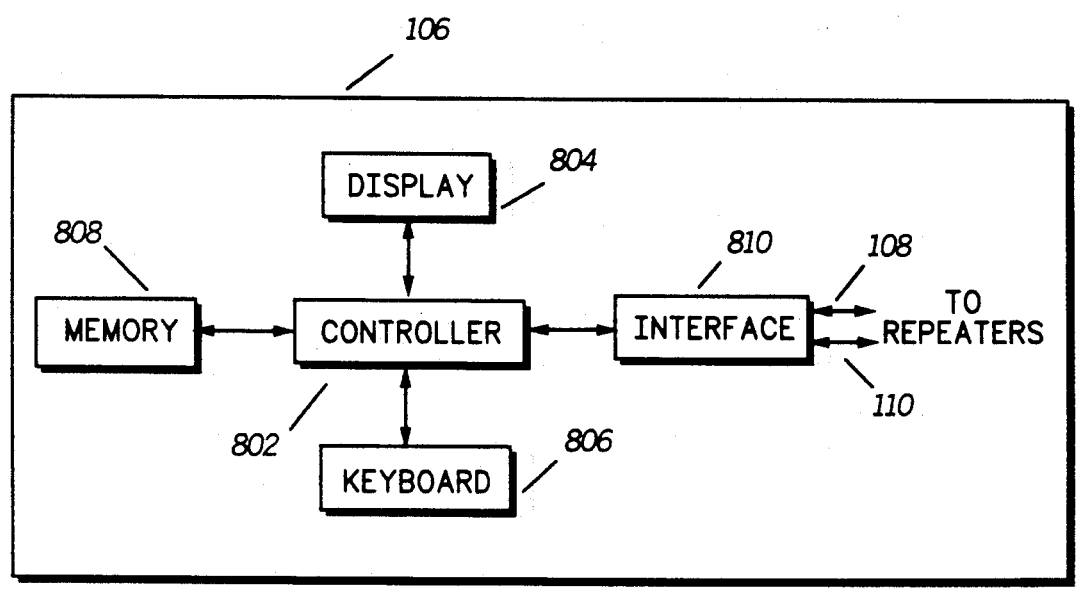
In FIG. 8 a block diagram of an interface switch in accordance with the present invention is shown.

In FIG. 8 shows a block diagram of an interface switch (system controller) 800 similar to interface switch 106 in accordance with the present invention. Interface switch 800 includes a control means or controller 802 which is a high performance computer with associated memory 808 and I/O capabilities as known by those skilled in the art. A keyboard 806 is provided to allow the system administrator to control the operation of the overall trunking system. A display 804 is provided in order to allow for visual information, such as displaying which talkgroups are using which repeaters, etc. An interface means 810 is provided which includes a bank of switches that switch control and audio information throughout the system (between one repeater in one site to another repeater in another site, etc.) under the control of controller 802. All audio/control buses coming from all of the sites, such as buses 108 and 110 are coupled to interface 810.

As discussed previously, interface switch 800 remaps the identities of the trunked radios which enter a non-trunking site, such as site 104 to associated radios in a dedicated control channel site 102. Also, "conventional only" (non-trunked) radios operating in site 104 are allowed to communicate with trunked radios in dedicated control channel sites, such as site 102 by the mapping which is done by controller 800. All mapping done by interface switch 800 is done by a mapping means such as a "look up" software program which is stored in memory 808 and performed by controller 802. The mapping software links the radio identification information used by the radios when they are operating in the dedicated control channel sites (site 102) to a new set of radio identification given to the radios when operating in site 104. This allows the radios operating in site 104 to communicate with radios in site 102. This mapping even allows radios which are non-trunked (also known as conventional only radios) operating in site 104 to communicate as part of a trunked talkgroup, since these radios are also given a set of mapped radio identification information. For example, non-trunked radios which utilize site 104 may be assigned (mapped) to a trunked radio talk group which has the non-trunked radio user supervisor who is physically located in site 102 as part of the talkgroup. IN this fashion the supervisor may be able to automatically communicate with these non-trunked radios via site 102 as if these radios where trunked radios. As discussed before, the radios can be dynamically assigned a re-mapped ID when entering a single channel site 104, or the radios can have both their standard and re-mapped ID's prestored in the radios controller 502. Control means 802 further includes an information means which is also part of control means 802 and provides control information signals to the radios in system 100 via interface 810 and then to the individual sites via buses 108 and 110. The information means is a conventional executive control routine stored in controller 802 which is responsible for the overall assignment of radios in system 100 utilizing OSW packets which are transmitted to the radios via the system repeaters, but, which further includes the mapping capabilities previously discussed.

In summary, the present invention solves key problems which are found in a majority of trunked system in operation. The present invention minimizes the cost of a trunked system by limiting low density sites to one repeater instead of two. Secondly, single channel remote sites are given much the same flexibility that dedicated control channel sites have (capable of providing group call partitioning, emergency call, dynamic regrouping, and other trunking features). Finally, the present invention allows for non-trunked radios to access the trunked system. The invention provides for enhanced system features, while at the same time providing for major system cost reductions by limiting the number of repeaters required in low density areas.

The present invention also provides non-trunked (known as conventional radios in the art) radios to communicate with the single channel repeater 122 in a normal fashion, for use in non-trunked communications to other radios in site 104. Also, non-trunked radios are capable of communicating with a dispatcher which is coupled to repeater 122 in case the radio user wants to be patched with other users not in site 104. Trunked capable radios operating in site 104 can access repeater 122 with a new "non-dedicated" control protocol utilizing "mapped" ISW's and OSW's that will map into standard trunking service requests and grants. This mapping will allow the radio to enjoy local or wide area trunking system services while accessing a single channel site 104. The "roaming radios" will be able to shift from their standard trunking protocol, that is used in the more traffic intensive areas, to the "non-dedicated" control method, used in the lightly loaded single repeater areas 104. By utilizing the present invention, trunked radios will be able to stay in contact with the home system fleet as well as with their home system dispatcher.

Overall the present invention provides improvements in remote site 104 cost, as well as spectrum efficiency is improved at these remote sites. While at the same time providing system users with more services throughout their total operating area.

What is claimed is:

1. A radio communication system for use by a first and a second radio, comprising:
    a system control means;
    a first communication site having a dedicated control channel and at least one communication channel, the first communication site is coupled to the system control means and the first radio when operating within the first communication site is responsive to the system control means via the dedicated control channel;
    a second non-dedicated control channel communication site having a communication channel coupled to the system control means; and
    said system control means further including a mapping means for allowing the first radio when operating in the first communication site to communicate with the second radio when it is operating in the second non-dedicated control channel communication site, the mapping means links unique radio identification information associated with each of the first and second radios when they are operating in the first communication site with a new set of radio identification information when either of the first or second radios is operating in the second non-dedicated channel site.

2. The radio communication system of claim 1, wherein the mapping means allows the system control means to automatically link the first radio operating in the first communication site with the second radio located in the second non-dedicated control channel communication site.

3. The radio communication system of claim 1, wherein the first communication site comprises a trunked communication system.

4. A communication device which is compatible with a first communication site having a dedicated control channel and a first communication channel, and a second non-dedicated control channel communication site having a second communication channel, both the first communication site and the second non-dedicated control channel site are coupled to a system controller, said communication device comprising:
    means for communicating with the system controller when said communication device is operating in the first communication site;
    means for detecting when the communication device leaves the first communication site and enters the second non-dedicated control channel site;
    means for communicating via the second communication channel when operating in the second nondedicated control channel communication site in order to communicate with a second communication device located in the first communication site, said means including a controller means for mapping a communication device identification number and a communication device group identification number which are associated with the communication device with a new communication device identification number and a new group identification number which are associated with the second non-dedicated control channel site.

5. A communication device which is compatible with a first communication site having a dedicated control channel and a first communication channel, and a second non-dedicated control channel communication site having a second communication channel, both the first communication site and the second non-dedicated control channel site are coupled to a system controller, said communication device comprising:
    means for communicating with the system controller when said communication device is operating in the first communication site;

means for detecting when the communication device leaves the first communication site and enters the second non-dedicated control channel site, said means for detecting including:

a receiver for receiving information from the dedicated control channel while the communication device is operating in the first communication site;

a means for determining when no more information is being received from the control channel; and said receiver further including a means for determining when the communication device has entered the second non-dedicated control channel site; and means for communicating via the second communication channel when operating in the second non-dedicated control channel communication site in order to communicate with a second communication device located in the first communication site, said means including:

a transmitter; and a controller means for mapping a communication device identification number and a communication device group identification number which are associated with the communication device with a new communication device identification number and a new group identification number which are associated with the second non-dedicated control channel site.

6. The communication device of claim 5, wherein the communication device is a trunked radio.

7. A method for mapping radio identification information in order to allow a first communication device having a first set of radio identification information and operating in a first communication site which has a dedicated control channel and at least one communication channel, to communicate with a second communication device having a set of radio identification information and operating in a second non-dedicated control channel communication site, the second non-dedicated control channel communication site having a communication channel, both the first and second communication site being coupled to a system controller, the method comprising the steps of:

receiving a channel request from either the first or the second communication device;

determining from which site the request is coming from;

searching for an available channel at the site the request is coming from;

assigning an available channel at the site the request is coming from once a channel is available and assigning a corresponding channel at the other site;

linking the channel assigned at the first communication site to the channel assigned at the second together via the system controller; and mapping the radio identification information found in the second communication device to a new set of radio identification information which is associated with the first set of radio identification information found in the first communication device in order to link the first communication device to the second communication device.

8. The method of claim 7, wherein the mapping step is performed by a control means located in the system controller.

9. The method of claim 7, wherein the first and second communication devices are trunked radios.

10. A system controller capable of linking radios operating in a first communication site having dedicated control channel and at least one communication channel to associated radios operating in a second non-dedicated control channel communication site having a communication channel, both the first communication site and the second non-dedicated control channel sites are coupled to the system controller, the radios operating in the first communication site and the radios operating in the second non-dedicated control channel communication site each have radio identification information, the system controller comprising:

control means for decoding information coming from the first and second communication sites;

interface means responsive to the control means for interfacing the first communication site to the second non-dedicated control channel site upon receiving a channel request from one of the radios; and mapping means for mapping the radio identification information from said radios operating in the first communication site with said associated radios operating in the second non-dedicated communication channel site in order for said radios operating in the first communication site to communicate with said associated radios operating in the second non-dedicated control channel site.

11. The system controller of claim 10, wherein the control means further includes an information means for providing radios operating in the second non-dedicated control channel site information as to when they are capable of transmitting information to the communication channel of the second non-dedicated control channel site.

12. The system controller of claim 10, wherein the system controller is a trunked system controller.

* * * * *